United States Patent [19]
Slocum et al.

[11] Patent Number: 5,469,310
[45] Date of Patent: * Nov. 21, 1995

[54] AUTOMATED CASSETTE LOADER

[75] Inventors: Richard T. Slocum, Aliso Viejo; James Bjordahl, Arcadia; Danny Louie, Monterey Park; Donald Rasmussen, Arcadia, all of Calif.

[73] Assignee: WangDAT, Inc., Irvine, Calif.

[*] Notice: The portion of the term of this patent subsequent to Feb. 18, 2009, has been disclaimed.

[21] Appl. No.: 953,411

[22] Filed: Sep. 29, 1992

Related U.S. Application Data

[63] Continuation-in-part of Ser. No. 800,615, Nov. 27, 1991, which is a continuation of Ser. No. 435,726, Nov. 13, 1989, Pat. No. 5,089,920.

[51] Int. Cl.⁶ .................................................. G11B 15/68
[52] U.S. Cl. .................................................. 360/92
[58] Field of Search ............................ 360/92; 242/200, 242/337; 414/932; 369/34

[56] References Cited

U.S. PATENT DOCUMENTS

| | | | |
|---|---|---|---|
| 3,807,741 | 4/1974 | Uemura | 360/92 |
| 4,381,527 | 4/1983 | Titus, IV et al. | 360/92 |
| 4,912,575 | 3/1990 | Shiosaki | 360/92 |
| 5,089,920 | 2/1992 | Bryer et al. | 360/92 |
| 5,157,564 | 10/1992 | Theobald et al. | 360/92 |
| 5,184,260 | 2/1993 | Pierrat | 360/92 |

FOREIGN PATENT DOCUMENTS

| | | | |
|---|---|---|---|
| 0277634 | 11/1991 | European Pat. Off. | |
| 63-200352 | 8/1988 | Japan | 360/92 |
| 0951386 | 8/1982 | U.S.S.R. | 360/92 |
| 1332630 | 10/1973 | United Kingdom | |
| 2229850 | 10/1990 | United Kingdom | |
| 8602192 | 4/1986 | WIPO | |

Primary Examiner—Robert S. Tupper
Assistant Examiner—David D. Davis
Attorney, Agent, or Firm—Robbins, Berliner & Carson

[57] ABSTRACT

An automated cassette loader system includes a front loading tape drive mounted in a standard height enclosure with a removable magazine including cassettes stored in front to rear alignment in two levels. The cassettes are pushed between entry and exit positions by pushing one cassette out of a push position in one level and then pushing a cassette from a push position in the other level. The cassette pushed out of the magazine is transported to the front loading tape drive and, when removed therefrom, transported to the intake of the other level of the magazine.

55 Claims, 9 Drawing Sheets

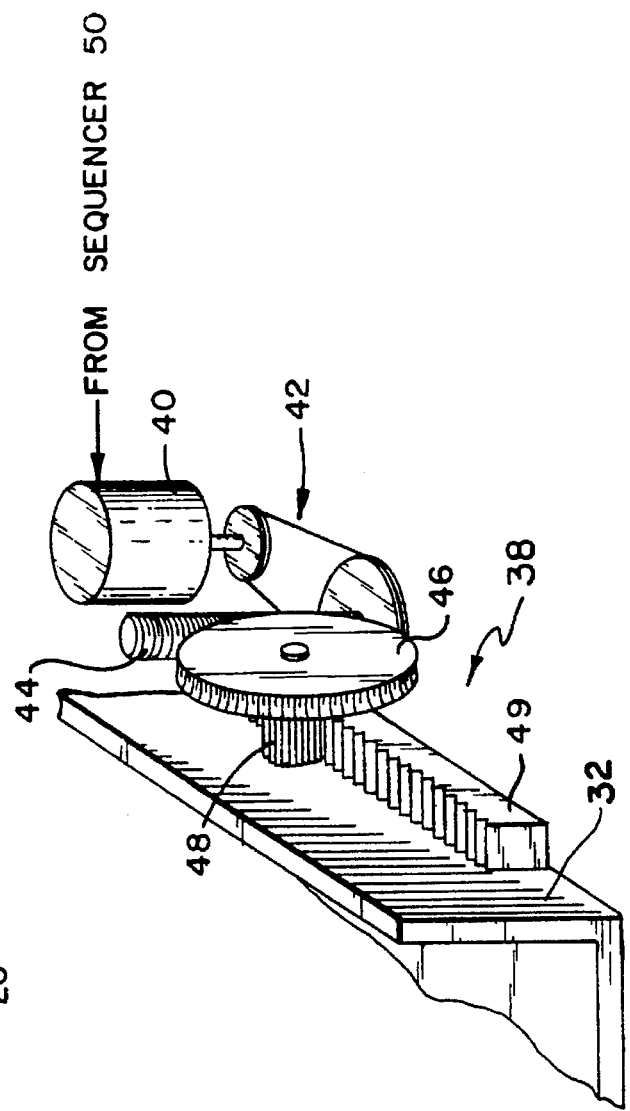
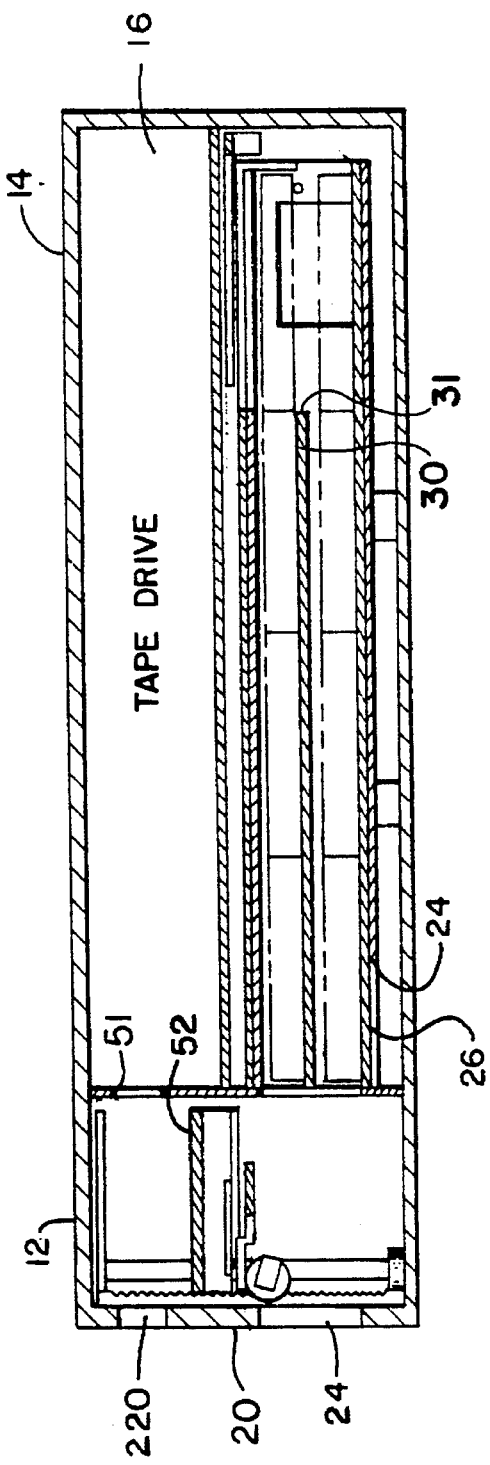
FIG. 4
FIG. 5

AUTOMATED CASSETTE LOADER

CROSS-REFERENCE TO RELATED APPLICATION

This application is a continuation-in-part of patent application Ser. No. 07/800,615, filed Nov. 27, 1991, which is a continuation of patent application Ser. No. 07/435,726, filed Nov. 13, 1989, by Philip S. Bryer et al., entitled "LOADER MECHANISM FOR TAPE CARTRIDGE SYSTEMS," now U.S. Pat. No. 5,089,920, which patent is incorporated by reference herein.

BACKGROUND OF THE INVENTION

1. Field of the Invention

This invention relates to systems for storing large quantities of data in digital audio tape (DAT) or other format, and more particularly to such systems utilizing an automatic cassette loader mechanism.

2. Description of Related Art

Magnetic tape storage devices are widely used for the storage of large amounts of digital data, because they provide an economical and reliable means for temporary and permanent storage. Because magnetic tape systems inherently rely on serial recording, access times are substantially longer than other modern storage devices, but at the same time the danger of catastrophic failure is virtually absent. Thus it has become common practice to utilize tape systems as data backup for hard disk files, typically by reading out the entire contents of a random access memory system at the end of the day or other operating period, and retaining this data in storage until the next backup date or time. Where the volume of data is limited, one tape system and tape reel or cartridge may suffice, but where the data base is much larger, many reels or cartridges may be needed. To utilize a backup system efficiently, it is preferred to record the backup data at a high data transfer rate during what would normally be down time for the system, e.g. the time between the close of business one evening and the start of business the next morning.

Tape drive systems have evolved over the recent past with technical improvements that have resulted in substantial increases in capacity accompanied by significant decreases in size. Large self-contained tape transports using parallel track recording techniques and relatively wide tape have been used, but these are incompatible in size, cost and power requirements with the compact and highly efficient central processor units and disk drives that are now employed. Threading of tape in reel-to-reel devices has always been a cumbersome task, so that efficient tape cassette and cartridge systems have been generated, using longitudinal scan recording techniques. By improvements in recording techniques and efficient cartridge configurations, these tape drives have been made in geometries and with sizes suitable for utilization with a standard peripheral equipment slot in a console, such as the full height slot for receiving a 5¼" floppy disk drive.

More recently, helical scan recording techniques originally devised for video recording have been adapted in compact systems to provide high density, high fidelity, digital audio tape recordings. The DAT format has in turn been adapted, under the so-called Sony/Hewlett-Packard standard, to digital data processing applications. The cassette (also called a cartridge) used for these applications is very small, the standard 4 mm digital audio cassette being 0.39" (10 mm) in height by 2.1" (54 mm) in depth, with a nominal tape width of 0.15" (3.81 mm). The recording technique used is group code encoding with error correcting codes, to the "DDS" specification X3B5/88-185A. "DDS" is a trademark of Hewlett-Packard/Sony. Using helical scan technology and 61K bpi linear density, each cassette has a data capacity of 2.0 Gbytes so that at a sustained transfer rate of 183 Kbytes/sec. (burst transfer rate of 4.0 Mbytes/sec.) there is a capacity for receiving 3.0 hours of data, equivalent to the contents of three large 650 Mbyte disk drives. Large commercial organizations, however, may have many such drives, in a data base system. Consequently large main frame and parallel processors need to use many backup cassettes, even in the DAT format. This is not only more costly but less efficient. It is preferable to utilize a single drive to prepare a number of tape records in sequence, rather than to employ a number of drives in parallel. Thus stacker-type loaders have been considered that fit on the front of the console in which the tape drive is mounted, as add-on units, to provide a handler for the cassettes. This approach is unsatisfactory for aesthetic, safety and technical reasons, and is often unusable simply because of the location of the tape drive unit, since there is usually inadequate clearance available relative to other parts of the computer console.

SUMMARY OF THE INVENTION

To overcome the limitations in the prior art described above, and other limitations that will become apparent upon reading and understanding the present specification, the present invention discloses a cassette loading system for tape drives comprising a tape drive unit, and a removable magazine resident adjacent thereto, together with a transporter for shifting cassettes between openings in the entry and exit levels of the magazine and a loading door of the tape drive unit. The arrangement is preferably utilized with a tape storage system using cassettes for recording and reproducing in the DDS format, such as a streaming tape drive for backup of random access memories.

With this arrangement, a completely self-contained system can be mounted within an enclosure in a PC chassis defining a standard peripheral form factor. In a preferred example, the space in a standard height enclosure, such as used for a 5¼" storage device, is occupied by a DAT drive unit of less than full height and an adjacent magazine in the remaining space within the enclosure, to fully utilize the available form factor.

The magazine is a two level structure which comprises an entry level or guideway superimposed above an exit level or guideway, both of which are disposed parallel to the front to rear axis of the tape drive. The magazine stores a front-rear array of slidable cassettes in both entry and exit levels.

The system includes internal adjacent mechanisms which circulate the cassettes within the magazine. The magazine has access apertures in the rearward top, bottom and sides thereof through which a rearwardly mounted paddle may shift cassettes from the rear to the front of the exit level of the magazine and a rearwardly mounted plunger may shift cassettes from the higher or entry level to the lower or exit level. At the front of the enclosure, a vertical transporter is mounted to span the distance from the front loading door of the tape drive to the magazine so as to transfer cassettes received from the tape drive to the entry level of the magazine, and to supply cassettes received from the exit level of the magazine to the loading door of the tape drive. The transporter includes a vertically movable cassette holder along with a lateral drive mechanism. The lateral drive mechanism includes means for shifting a single cassette laterally in the front-rear direction, so as to impel cassettes either into the tape drive or magazine, and to remove partially ejected cassettes from the tape drive or magazine.

The system includes a separately actuable tray for accepting the magazine into the enclosure. The tray includes a side-coupled rack engageable by an adjacent mechanism to draw the magazine residing in the tray into a fully inserted position and to propel the magazine out of the housing, so that magazines can be inserted into and removed from the assembly as desired. The magazine is provided with a latching door which prevents cassettes from being added to or removed from the magazine until the magazine is fully inserted in the enclosure.

In addition, a write protect assembly for the magazine is provided which permits write protection for the entire magazine without requiring the utilization or operation of the individual write protect tabs on each cassette. The magazine write protect tab assembly includes a movable tab as well as a combined groove and capture device.

On a practical basis, this enables data transfer to take place substantially continuously with operator intervention required only to change magazines.

In a first aspect, the present invention provides apparatus for use in tape cassette loading systems including a magazine housing for holding tape cassettes in a first plurality of cassette positions in a first plane and in a second plurality of cassettes positions in a second plane parallel therewith, each such cassette position in said first plurality separated from each such cassette position in said second plurality except for a transfer position in each such plurality, paddle means for expelling a tape cassette from said transfer position in said second plane and plunger means for transferring a tape cassette from said transfer position in said first plurality into said transfer position in said second plurality.

In another aspect, the present invention provides a method of operating a tape cassette loading system by holding tape cassettes in a magazine housing in a first plurality of cassette positions in a first plane and in a second plurality of cassettes positions in a second plane parallel therewith, each such cassette position in said first plurality separated from each such cassette position in said second plurality except for a push position in each such plurality, expelling a tape cassette from said push position in said second plane, and pushing a tape cassette from said push position in said first plurality into said push position in said second plurality.

In a still further aspect, the present invention provides an automated cassette loader system having an enclosure substantially defining a standard peripheral form factor, a tape drive mounted in the enclosure, a magazine removably mounted in the enclosure for storing cassettes in entrance and exit storage levels, transporter means, disposed within the enclosure adjacent both the magazine and the tape drive, for transporting the cassettes between the tape drive and the magazine, and circulation means for sequentially circulating cassettes from the magazine to the tape drive by expelling cassettes from the exit storage level to the transporter means and then pushing cassettes to the exit storage level from the entrance storage level.

BRIEF DESCRIPTION OF THE DRAWINGS

Referring now to the drawings in which like reference numbers represent corresponding parts throughout:

FIG. 4 is a perspective view of the rack and pinion driver mechanism on the side of the magazine tray shown in FIG. 3;

FIG. 5 is a cross-sectional side view of the automated cassette loader system of FIG. 1 including a multi-cassette magazine inserted in a magazine tray, a tape drive, and a transporter mechanism;

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
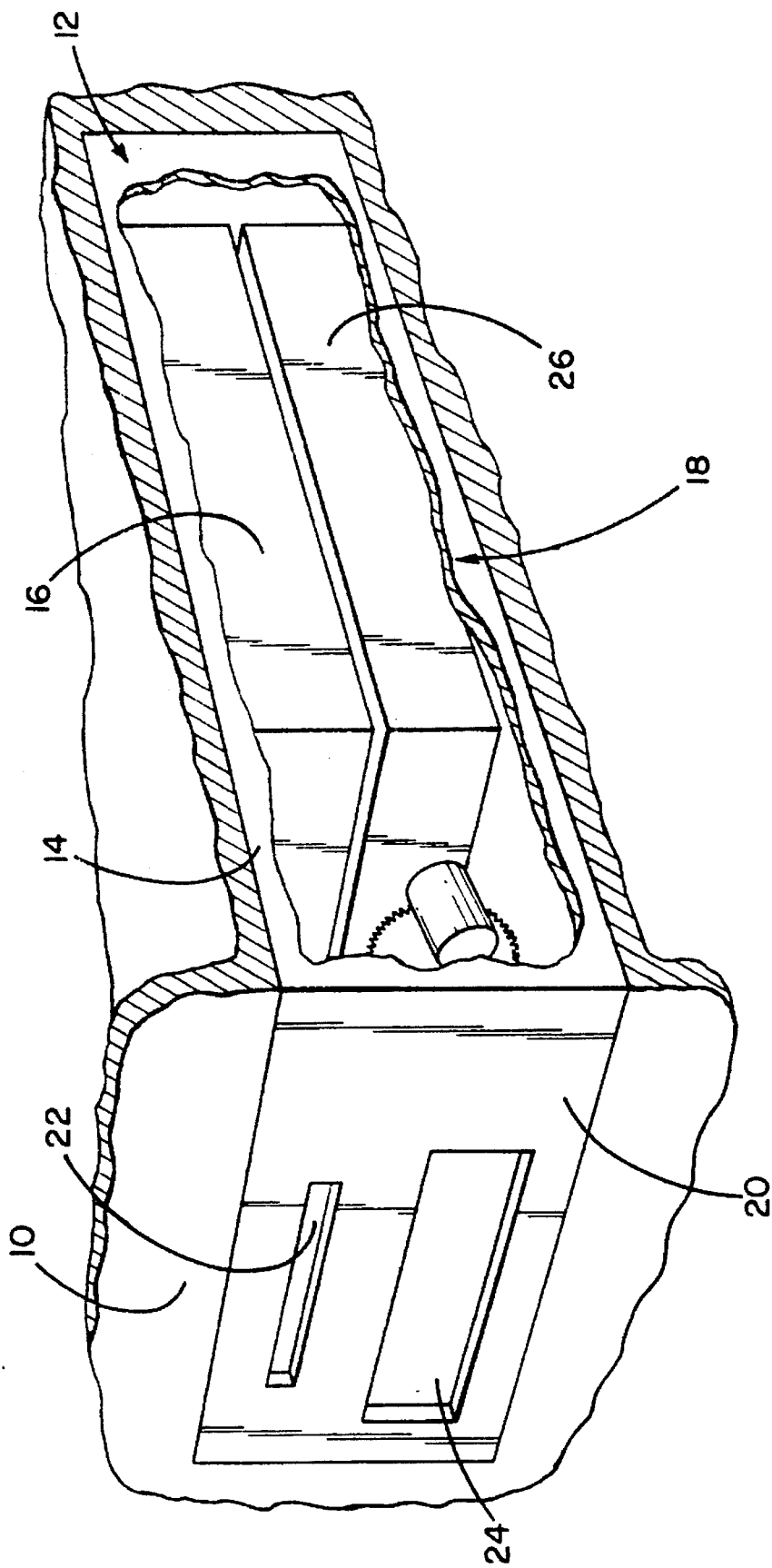
FIG. 1 is a perspective view, partially broken away, of a tape drive system and automatic cassette loader mechanism in accordance with the present invention.

FIG. 1 describes a system in accordance with the invention. The present invention is used in conjunction with a PC chassis 10, such as one which has a standard 5.25" full height enclosure 12 defining a standard peripheral form factor. The enclosure 12 may itself be defined by a housing 14 which fully or partially envelops the enclosure 12.

The enclosure 12 has an available volume substantially defined as having a height of 3.25", a depth of 8" and a width of 5.75", although those skilled in the art will recognize that these dimension could be altered somewhat. For example, in most of the PC chassis 10 on the market today, there is some tolerance to these dimensions so that devices configured to be positionable within a standard peripheral form, such as the present invention, could extend somewhat beyond the bounds of the dimensions of the enclosure 12.

Figure 6:
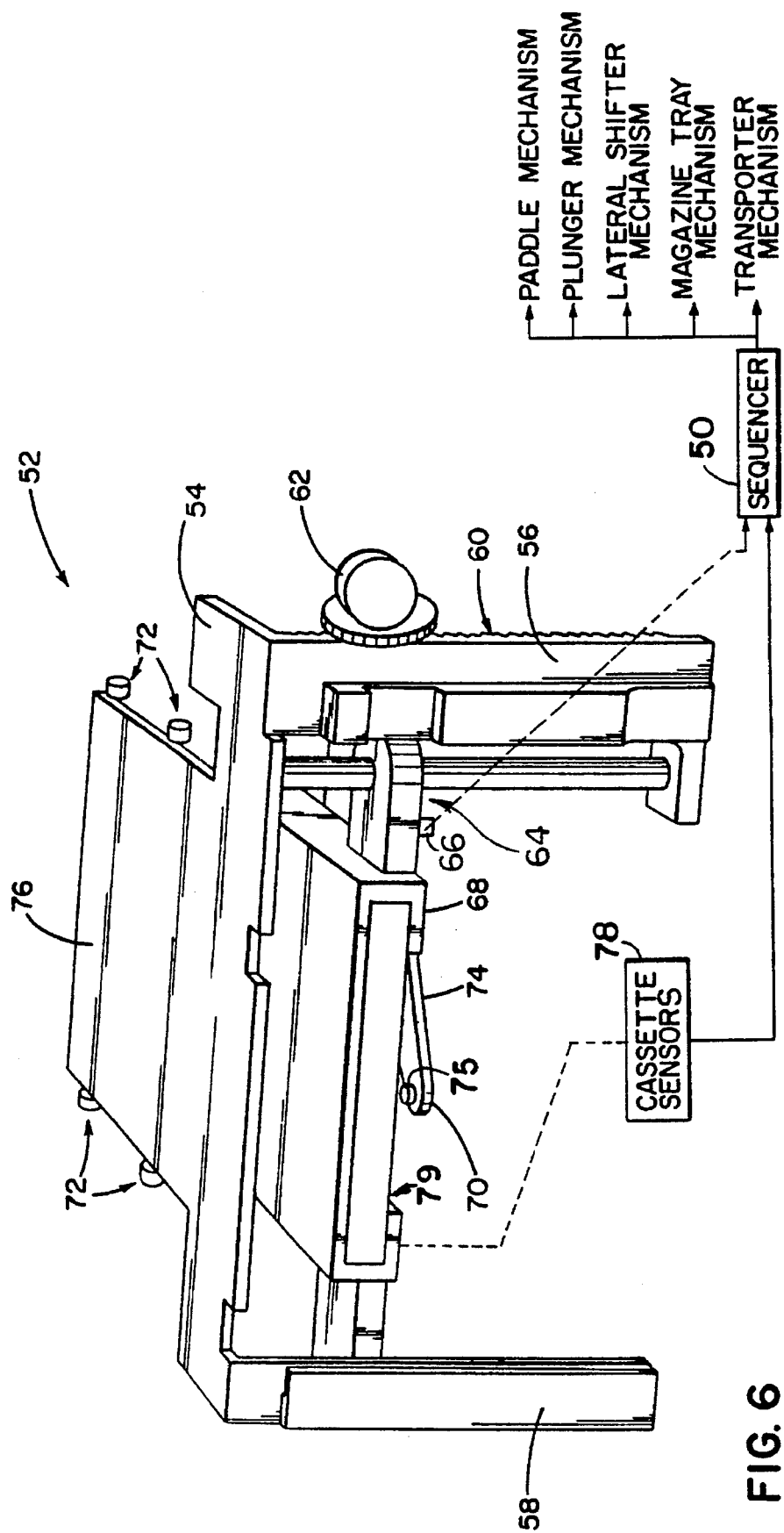
FIG. 6 is a perspective view of the transporter mechanism shown in FIG. 5.
Figure 9:
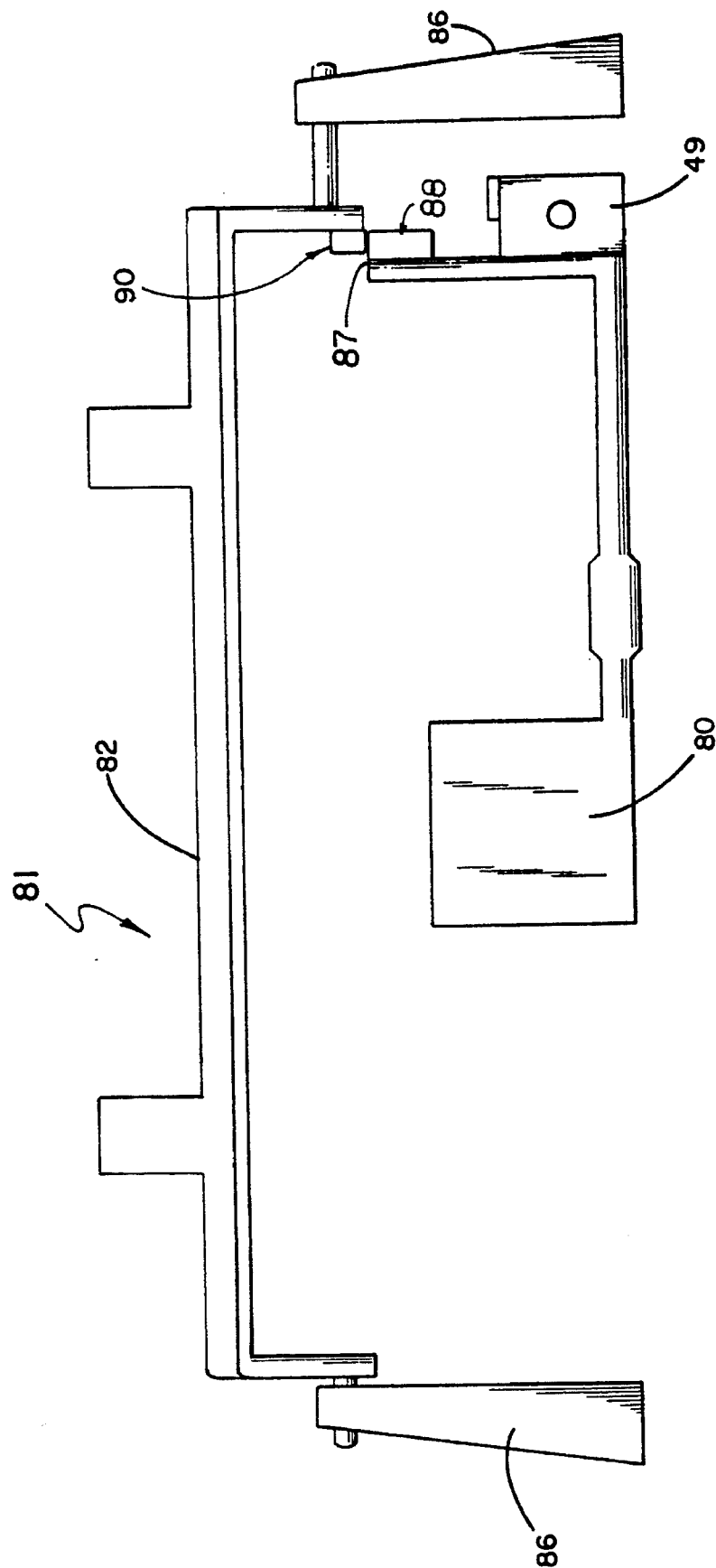
FIG. 9 is a perspective view of the combined plunger and paddle portions shown in FIGS. 7 and 8 of the cassette circulation mechanism.

A tape drive 16 including a tape or cassette utilization position in which data is read from or written to the cassette, and an automatic cassette loader mechanism 18 in accordance with the invention to transfer cassettes into and out of the tape utilization position, are fitted into the enclosure 12 along a front to rear axis and may substantially fill the available volume therein. Automatic cassette loader mechanism 18 includes removable magazine 26, positioned within movable magazine tray 32 as shown for example in FIG. 3, transporter mechanism 52 as shown in FIGS. 5 and 6 and cassette circulating mechanism 81 as shown in FIG. 9. Within the available volume in full height enclosure 12, the tape drive 16 may conveniently be disposed in the upper portion as shown in FIG. 1, although those skilled in the art will recognize that it could be mounted in other positions within the available volume.

The present invention is described in conjunction with digital audio tape (DAT) drives, inasmuch as there is a particular need for an automatic cassette loader mechanism 18 in this environment in order to enable very large quantities of data to be recorded without a need for operator attendance. This need is common to all small tape drives. The tape drive 16 used in the preferred embodiment is a DAT 3½ inch form factor unit, such as the Model 3200 available from WangDAT Inc. of Irvine, Calif. The internal mechanism of the tape drive 16, which includes recording and reproducing circuits, servo drives, controller functions and cassette handling elements is not described herein inasmuch as these features are in the commercially available product. Note that the concepts of the invention are applicable, as will be apparent to those skilled in the art, in a number of other environments and applications.

The housing 14 defining the enclosure 12 includes a face plate or front bezel 20. Because the arrangement permits the system to be self-contained within the enclosure 12 and behind front bezel 20, the danger of damage to the system is greatly lessened and the aesthetics and convenience of the standardized construction of PC chassis 10 are preserved. The bezel 20 may include a single cassette access aperture or door 22 in an upper position aligned with a single cassette insertion access aperture 51 of tape drive 16 as shown in FIG. 5. Within tape drive 16, aligned with single cassette insertion access 51, is a conventional front loading cassette utilization position in which, for example, data may be read from or written to the cassette positioned therein.

The bezel 20 also includes a multi-cassette magazine access aperture or door 24 through which removable magazine 26 is inserted into and removed from enclosure 12. The magazine door 24 is aligned with movable magazine tray 32, shown for example in FIG. 3, so that magazine 26 may be conveniently inserted therein or removed therefrom. Single cassette access door 22 and magazine door 24 may simply be openings in bezel 20 or provided with hinged doors. Such details may be configured in accordance with conventional designs and are not shown herein for simplicity.

The cassettes used with the automatic cassette loader mechanism 18 of the present invention have a width greater than their depth which is in turn greater than their height. The typical enclosure 12 in which automatic cassette loader mechanism 18 of the present invention is mounted has a depth greater than its width which is greater than its height. The face of the cassettes including the width and height dimensions may for convenience be called the broad flat face of the cassette.

In accordance with the present invention, cassette holding and transfer positions are provided in entry and exit levels in parallel planes in which the broad, flat faces of cassettes in each level is in the same plane. These parallel planes are also parallel with the plane of enclosure 12 which includes the width and depth dimensions of that enclosure. In the preferred embodiment described herein, the cassettes circulate along the front to rear axis of enclosure 12, which is parallel with the depth dimension thereof, with the width dimension of the cassette parallel with the width dimension of the enclosure 12. Since the depth dimension of the cassettes is less than the width dimension of the cassettes, and the depth dimension of the enclosure 12 is greater than the width dimension of the enclosure 12, automatic cassette loader mechanism 18 provides an efficient configuration for storing and transferring cassettes from removable magazine 26 to a tape drive utilization position in tape drive 16 in which the width and depth dimensions of the utilization position are parallel with the width and depth dimensions of the cassette holding positions.

Figure 2:
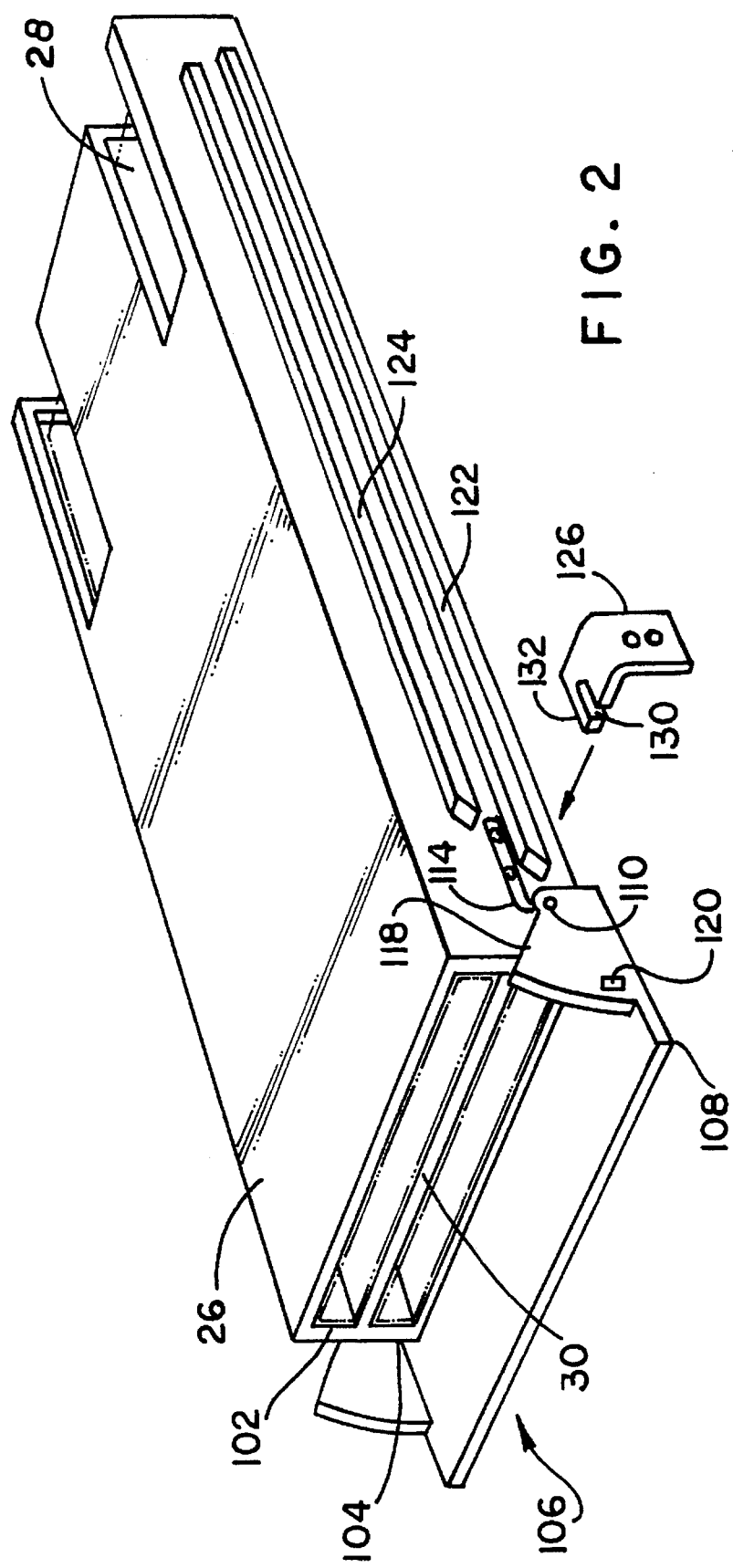
FIG. 2 is a perspective view of a multi-cassette magazine.

FIG. 2 illustrates the removable, multi-cassette magazine 26 of the present invention which is open at a front end 106 and includes cutouts 28 at the top of the other, or rearward, end. The magazine 26 is divided into upper or entry level 102 and lower or exit level 104 by a central divider such as horizontal plate 30. The levels 102 and 104 provide internal storage areas or holding positions for cassettes in which the cassettes reside on their broad faces with their narrow edges abutting adjacent cassettes. The cassette holding positions are shown by dotted lines in FIG. 5. The exit cassette level 104 may be said to have an exit aperture abutting an exit cassette position at front end 106 of removable magazine 26, while the entry level 102 has an entry aperture abutting an intake or entry cassette position at front end 106 of removable magazine 26.

Figure 3:
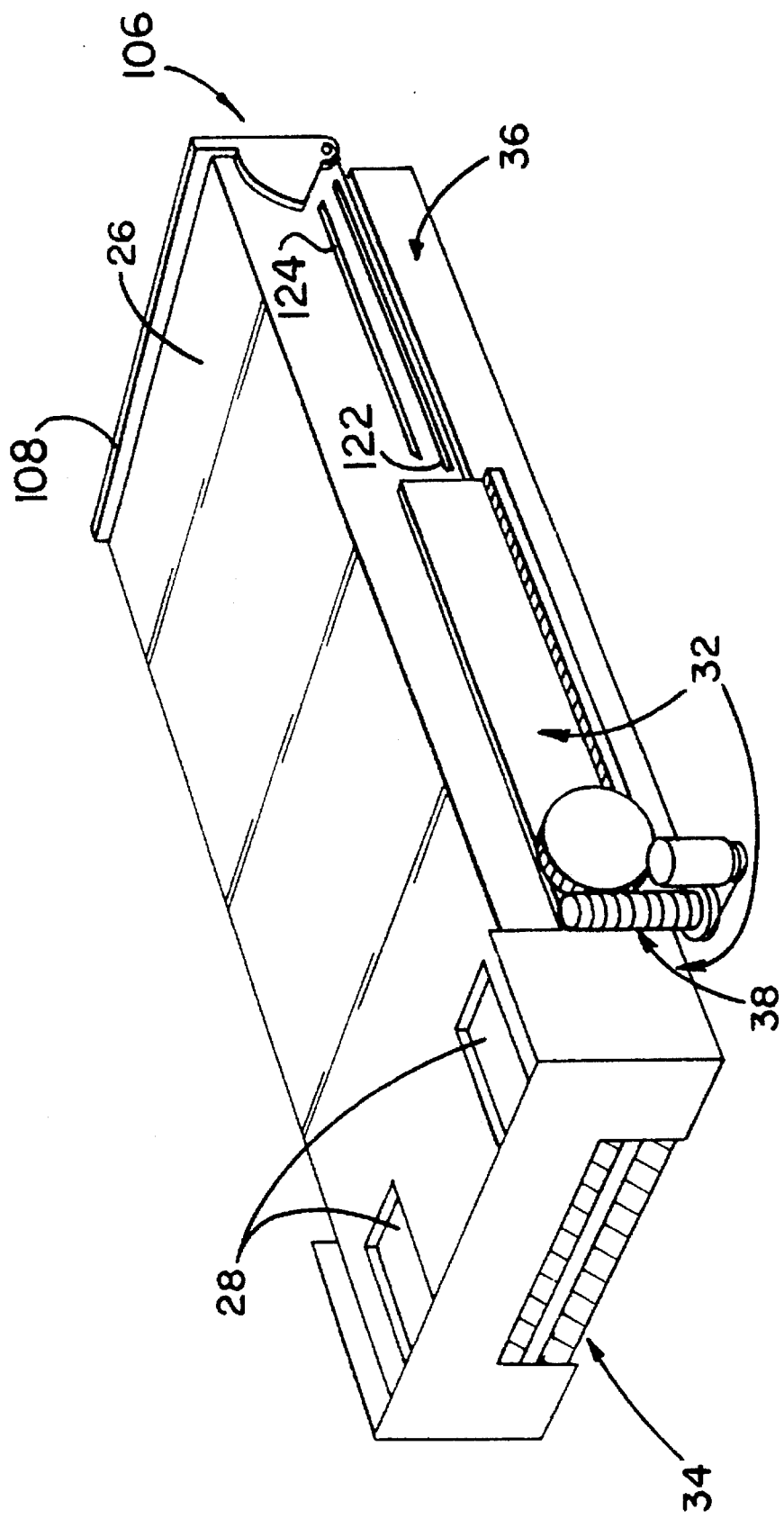
FIG. 3 is a perspective view of the magazine of FIG. 2 positioned in a magazine tray.

When removable magazine 26 is not inserted in automatic cassette loader mechanism 18, such as when being handled by an operator or during storage when not being used, front end 106 is blocked by cassette transfer door 108 so that cassettes will not be accidently removed from or inserted into either the cassette entry position at the front end of entry level 102 or the cassette exit position at the front end of exit level 104. Cassette transfer door 108 is shown in FIG. 2 in the open position used during operation of automatic cassette loader mechanism 18 in FIG. 2. In FIG. 3 cassette transfer door 108 is shown in the closed position while positioned on movable magazine tray 32. Once movable magazine tray 32 has retracted within enclosure 12, cassette transfer door 108 would be in the open position as described in more detail below.

With cassette transfer door 108 in the open position as shown in FIG. 2, cassette storage positions in levels 102 and 104 are used sequentially in the circulation of cassettes into the entry cassette position through the entry aperture at the front end 106, through the various cassette storage positions in the entry and exit levels 102 and 104 and out of the exit aperture from the exit cassette position in the front end 106 of the magazine 26. In the closed position, as shown in FIG. 3 below, cassettes in cassette storage positions in removable magazine 26 are prevented from falling out or being unintentionally inserted.

Figure 10:
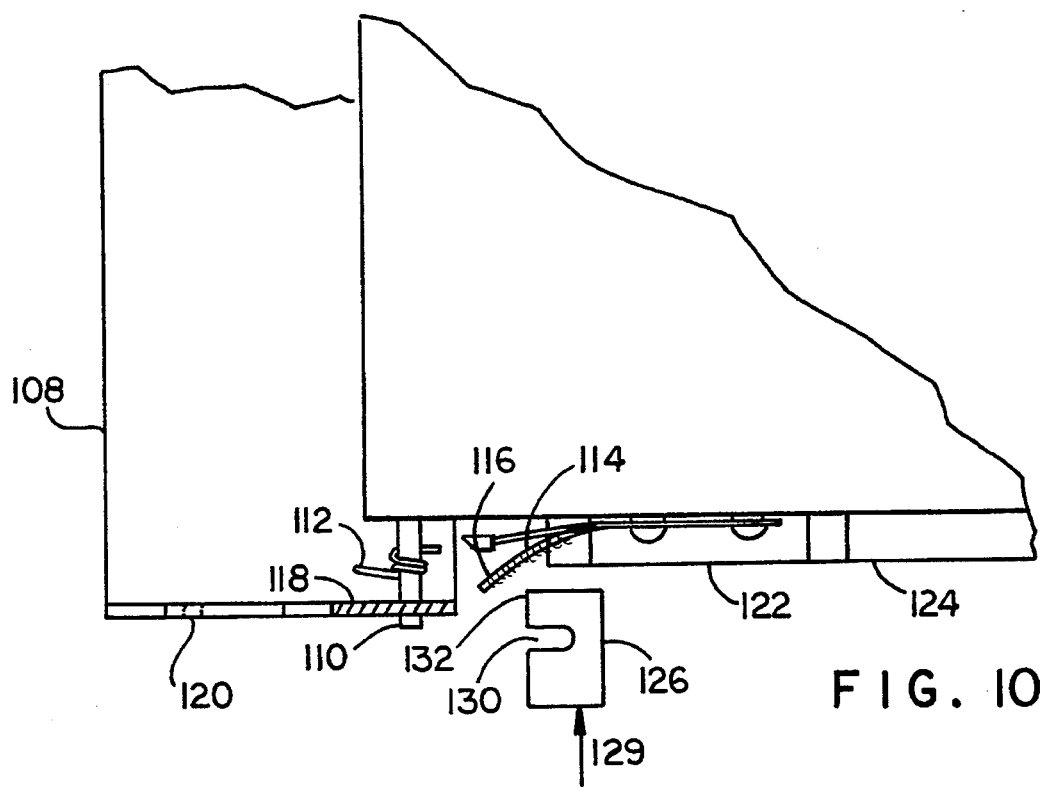
FIG. 10 is a top plan view of a portion of the removable magazine shown in FIG. 2.

With reference now also to FIG. 10, the operation of cassette transfer door 108 may be described in greater detail. Cassette transfer door 108 is mounted to removable magazine 26 by axle 110 which may conveniently be a pair of pivot points extending outward from the body of removable magazine 26. Cassette transfer door 108 is maintained in a normally closed position, blocking the entry and exit cassette holding positions at the front end 106 of removable magazine 26, by spring 112 which may conveniently be a simple torsion spring coaxially mounted around axle 110. In the closed position as shown in FIG. 3, cassette transfer door 108 is secured in the closed position by door latch mechanism 114 which includes catch 116.

Door latch mechanism 114 may conveniently be made of spring steel, or other springy material, and affixed to the body of removable magazine 26 by any suitable mechanism, such as a pair of screws, so that catch 116 is urged into an extended position away from the body of magazine 26 as shown in FIG. 10. Guide rail 124 is shorter than guide rail 122 to avoid interference with contact edge 118 when cassette transfer door 108 is in the closed and latched position. The positioning of door latch mechanism 114 between guide rails 122 and 124 prevents accidental or casual operation of door latch mechanism 114.

As cassette transfer door 108 is being closed, the spring action of door latch mechanism 114 causes catch 116 to push against the side of cassette transfer door 108 until mating contact is achieved with door latch slot 120 through which catch 116 then extends. In the closed position, when catch 116 extends through door latch slot 120, cassette transfer door 108 is latched closed and cannot easily be opened without compression of door latch mechanism 114 against the body of removable magazine 26.

As shown in FIGS. 2 and 3, removable magazine 26 includes guide rails 122 and 124 parallel with the front-to-rear axis thereof. Guide rails 122 and 124 interact with a mating protrusion 126 which has been moved away from its normal position for clarity in the drawings. Mating protrusion 126 is conveniently mounted in enclosure 12 so that it is displaced from the position shown, in the direction indicated by arrow 128 in FIG. 2 and arrow 129 in FIG. 10, to interact with guide rails 122 and 124, door latch mechanism 114 and contact edge 118 as magazine 26 is inserted into and out of its operating position in contact with contact edge 118 by operation of movable magazine tray 32.

In particular, as noted above, spring 112 maintains cassette transfer door 108 in a normally closed position, blocking front end 106 and thereby preventing cassettes from being inserted into or removed from magazine 26. When magazine 26 is inserted into enclosure 12 by operation of movable magazine tray 32, guide rails 122 and 124 of magazine 26 move relative to mating protrusion 126 which is affixed to enclosure 12. Guide rails 122 and 124 are asymmetrically positioned on the side of the body of magazine 26 and positioned to receive tang 132 at the end of mating protrusion 126 therebetween so that removable magazine 26 may only be inserted in enclosure 12 in the proper orientation.

As removable magazine 26 is inserted past mating protrusion 126, cassette transfer door 108 remains in the closed and latched position until tang 132 contacts and compresses door latch mechanism 114 sufficiently against the body of removable magazine 26 so that catch 116 is disengaged from door latch slot 120 permitting cassette transfer door 108 to be opened. As magazine 26 is further inserted into enclosure 12, sliding surface 130 of mating protrusion 126 strikes contact edge 118, pushing cassette transfer door 108 open. When removable magazine 26 is fully inserted in enclosure 12 by operation of movable magazine tray 32, mating protrusion 126 is positioned above axle 110 and has controlled the permitted orientation of removable magazine 26, compressed door latch mechanism 114 to permit opening of cassette transfer door 108 and caused contact edge 118 to slide against an edge of mating protrusion 126 to force cassette transfer door 108 to open.

When removable magazine 26 is removed from enclosure 12 by operation of movable magazine tray 32, spring 112 maintains contact between contact edge 118 and sliding surface 130 of mating protrusion 126 causing cassette transfer door 108 to automatically close. When removable magazine 26 has been fully removed from enclosure 12, mating protrusion 126 is disengaged from door latch mechanism 114 so that cassette transfer door 108 is not only closed, but also latched, by engagement of catch 116 with door latch slot 120. The latching of cassette transfer door 108 when removable magazine 26 is positioned outside of enclosure 12 is particularly important for multi-cassette operation to prevent the order of the cassettes within removable magazine 26 from being accidently disturbed. The sequence of the cassettes from which data is written to or read from is critical in most operations. Because of the serial nature of cassettes, and the data stored thereon, the accidental displacement of one cassette could render unusable the data written to the series of cassettes in a magazine, or read from the cassettes into tape drive 16, in a host computer or other data using device.

Referring now to the internal construction of magazine 26, it may hold two, three, four, or some other number of cassettes in each level, the number of cassettes being determined by the relationship between the depth of the magazine 26 and the depth of the individual cassettes. The maximum depth of removable magazine 26 is determined by the depth of enclosure 12. In the embodiment shown in FIG. 5, the depth of entry and exit levels 102 and 104 of the magazine 26 extends far enough to include four cassette holding positions. Central dividing plate 30 extends rearward from the front end 106 of removable magazine 26 to separate all but one of the cassette holding positions in one level from all but one of the cassette holding positions in the other level. Central dividing plate 30 need not extend fully across the width of magazine 26 but may only be a pair of rails or protrusions which partially extend inward from the sides of magazine 26 to the center.

As noted above, central dividing plate 30 does not extend the full depth of removable magazine 26 and therefore includes a gap or transfer aperture 31, as shown in FIG. 5, between the entry and exit levels 102 and 104 in the rearmost cassette holding position referred to herein as the cassette transfer position. As a result, the broad face of the cassette in the cassette transfer position in the entry level 102 is in the plane of the central dividing plate 30 in transfer aperture 31 and is therefor next adjacent the broad face of the cassette in the cassette transfer position in the exit level 104 which is also therefore in the plane of the central dividing plate 30 in transfer aperture 31. When the cassette in the cassette transfer position in the exit level 104 of removable magazine 26 is shifted toward the front end 106 of removable magazine 26, the cassette in the cassette transfer position in the entry level 102 is moved through the plane of central dividing plate 30, by means of transfer aperture 31, into the cassette transfer position in the exit level 104 thereby effecting the circulation of cassettes in the magazine 26.

Referring now to FIG. 3, removable magazine 26 is shown from a perspective opposite the one used in FIG. 2, that is, front end 106 is faced away from the observer. In this perspective, it can easily be seen that magazine 26 is configured to fit within magazine tray 32 of automatic cassette loader mechanism 18. Both the magazine 26 and the magazine tray 32 each include a rear cutout. When removable magazine 26 is inserted fully in movable magazine tray 32, these rear cutouts are aligned with each other to form cutout 34. Cutout 34, together with top cutouts 28 of removable magazine 26, cooperate with cassette circulation mechanism 81, described in more detail below with reference to FIG. 9, to provide for the circulation of cassettes through the various cassettes holding positions in removable magazine 26.

The magazine tray 32 is slidably movable on a low friction support, such as rails 36, in the front to rear direction of the enclosure 12. To more readily insert and retrieve the magazine 26, the magazine tray 32 is driven both forwardly and rearwardly on the rails 36 by a magazine tray drive mechanism 38.

FIG. 4 shows the magazine tray drive mechanism 38, which includes a drive motor 40 coupled by a cogged pulley drive 42 to a vertically disposed worm gear 44, which engages the periphery of a gear wheel 46 that rotates about a horizontal axis. A pinion 48 concentric with the gear wheel 46 engages a horizontal rack 49 that is mounted on the magazine tray 32. When the magazine tray 32 is empty, the rack 49 and coupled magazine tray 32 are driven to the forward limit position by the drive motor 40. In the forward limit position, the open front end of the magazine tray 32 is next adjacent to the magazine door 24 in the bezel 20, so that the loaded magazine 26 may be inserted through bezel 20 into the magazine tray 32.

Thereafter, a sequencer 50, shown in more detail in FIG. 6, operates motor 40 to drive the magazine tray 32 carrying the received magazine 26 thereon in the rearward direction until the magazine 26 is fully inserted within full height enclosure 12.

Referring now to FIGS. 5 and 6, transporter mechanism 52 is disposed in enclosure 12 between bezel 20 on one side and tape drive 16 on the other. Movable magazine tray 32 in its fully withdrawn position as shown in FIG. 5 is on the same side of transporter mechanism 52 as tape drive 16. Movable magazine tray 32, when moved into the receiving position next adjacent magazine door 24, passes through an aperture in transporter mechanism 52.

Transporter mechanism 52 may be operated as described below to enable the insertion of a single cassette through single cassette access aperture door 22 in bezel 20 directly into single cassette insertion access 51 in the tape drive 16. Similarly, transporter mechanism 52 may be configured to include an aperture therethrough aligned with magazine door 24 of bezel 20 and movable magazine tray 32 in the extended or receiving position enabling the insertion of removable magazine 26 into movable magazine tray 32 through bezel 20. In addition, transporter mechanism 52 may be operated to cause the exchange of cassettes between the tape drive 16 and the magazine 26 when positioned in movable magazine tray 32 in its fully retracted position within enclosure 12.

Referring now in particular to FIG. 6, transporter mechanism 52 includes a frame 54 having a pair of vertical posts 56 and 58, one on each side of enclosure 12, and spaced to permit unrestricted passage of either a cassette or the magazine 26 therebetween. A rack 60 supported along vertical post 56 is engaged by a pinion motor 62 which is positioned adjacent the post 56 on the outside of the post 56. A transverse carriage 64, supported by the posts 56 and 58, is raised or lowered in response to actuation of the motor 62 by the sequencer 50.

A position sensor 66, which detects the height of the transverse carriage 64 on the posts 56 and 58, provides position feedback information signals to the sequencer 50 to permit the accurate control of the position of transporter mechanism 52 and other mechanisms in the system. The specific form of sensor 66 used is not shown in detail, inasmuch as optical sensor elements, electro-mechanical sensor elements, a vertical scale, or an incremental motor with pulse counting may be used for this purpose. The sequencer 50 may be a microprocessor or a specialized control circuit for operating the various mechanisms in proper order and in various modes. Most of the movements are strictly repetitive, and only limited actions responsive to sensors are involved. The use of a microprocessor enables other functions to be added as well.

The transverse carriage 64 includes a cassette transport position holder 68 that supports a single cassette in a cassette transport position. The cassette holder 68 has an open gap 79 in its bottom region immediately below the lower broad face of the cassette transport position, so that a lateral shifter 70 can pass underneath the cassette being supported in the holder 68 in the transport position to engage the cassette from the rear for movement laterally in the front to rear direction.

The transverse carriage 64 incorporates a lateral shifter 70 and rollers 72 for moving single cassettes into and out of the tape drive 16 and the magazine 26. The lateral shifter 70 is mounted, along with its drive unit, on the transverse carriage 64. The rollers 72 are mounted on the top plate 76 of the transporter mechanism 52.

A drive motor unit (not shown) for the shifter 70 is coupled to control a swing arm component 74 of the lateral shifter 70 that extends radially toward the cassette in the cassette transport position of cassette transport position holder 68 on the cassette holder 52. The swing arm 74 is angularly movable in opposite directions of rotation along predetermined arcs. An engagement pin 75 at the end of the swing arm 74 registers against the rear of the cassette in the cassette transport position, to move the cassette in the rearward direction, as needed. When a cassette is to be inserted into the tape drive 16 or magazine 26 from the cassette transport position, the pin 75 registers against a standard depending lip along the rear lower edge of the cassette, and the swing arm 74 moves the cassette rearwardly for an appropriate distance. The cassette may thereby be inserted into tape drive 16 through single cassette insertion access 51 when transverse carriage 64 is aligned therewith. Similarly, the cassette may be inserted into the cassette intake or entry position at the front end 106 of removable magazine 26 from the cassette transport position by operation of swing arm 74 when transverse carriage 64 is aligned therewith.

A cassette sensor system 78 detects the orientation of the cassette and the direction from which a cassette enters the cassette transport position in transverse carriage 64 and when the cassette is centered therein. A number of expedients, such as an array of photosensitive elements, can be used for this purpose to provide signals to the sequencer 50. Thus, a detailed example is not given, in the interest of brevity.

Figure 7:
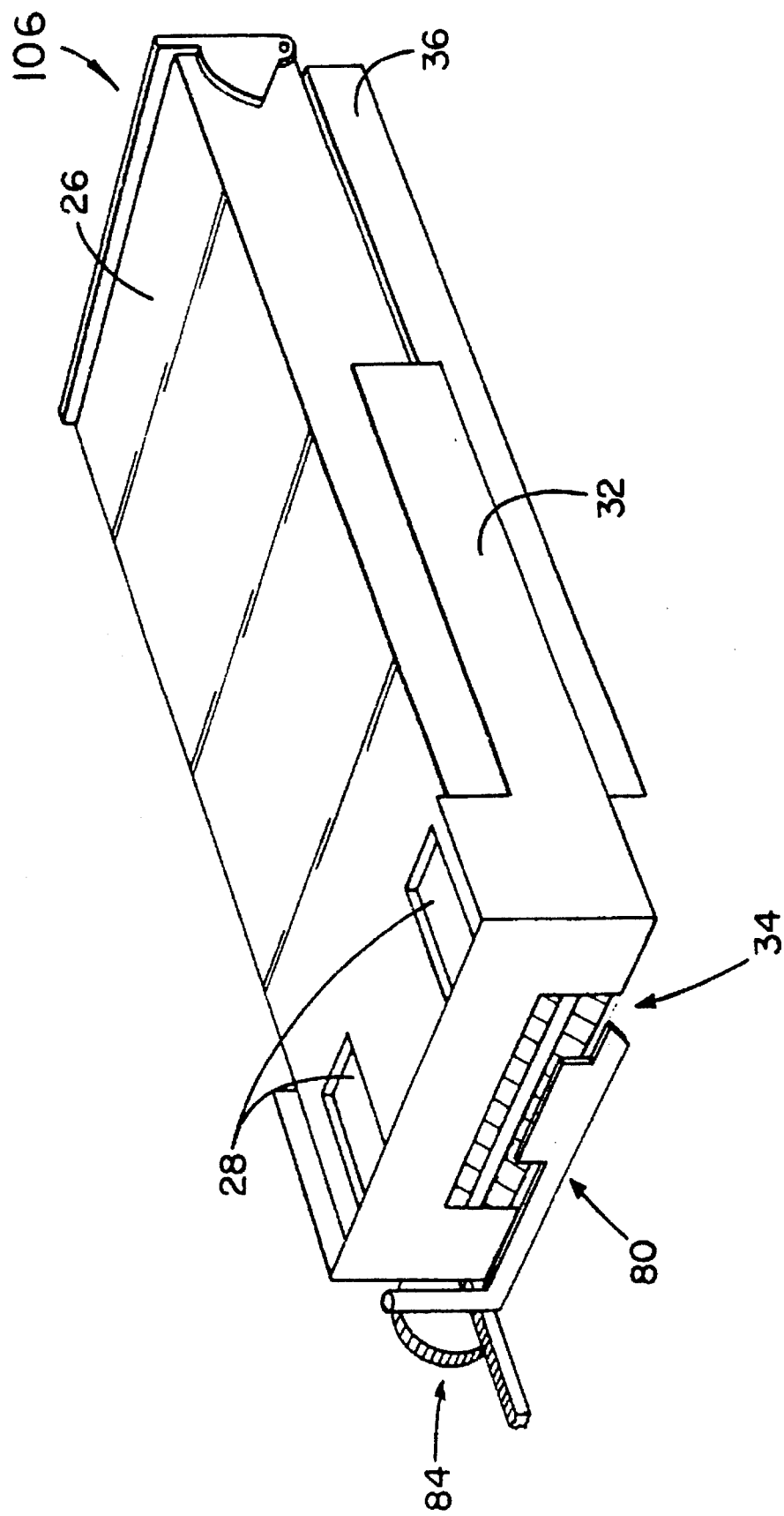
FIG. 7 is a perspective view of the multi-cassette magazine inserted in a magazine tray showing the paddle portion of a cassette circulation mechanism associated therewith.
Figure 8:
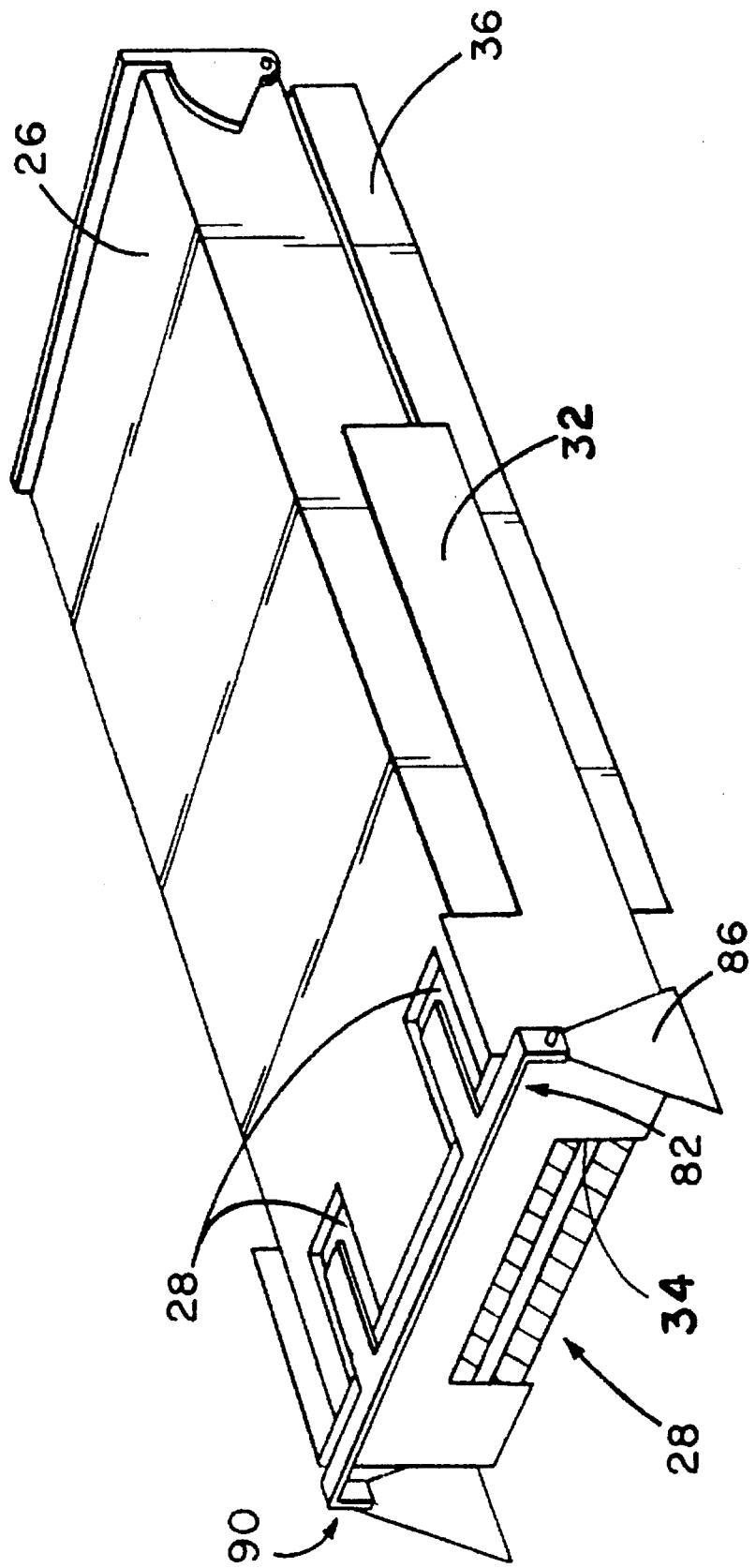
FIG. 8 is a perspective view of a plunger portion of the cassette circulation mechanism of FIG. 7.

Referring now to FIGS. 7, 8 and 9, cassette circulating mechanism 81 includes paddle 80 shown in FIG. 7 to effect lateral movement, plunger 82 shown in FIG. 8 to effect vertical movement, and cam mechanism 87 shown in FIG. 9 which controls the operation of paddle 80 and plunger 82.

As indicated above, automatic cassette loader mechanism 18 in the enclosure 12 includes magazine 26 positioned on movable magazine tray 32, transporter mechanism 52 and cassette circulating mechanism 81 including paddle 80 and plunger 82 operated by cam mechanism 87.

The paddle 80 and plunger 82, which circulate cassettes within the magazine 26, are mounted external to the magazine 26, although they have access to the cassettes within the cassette transfer positions in the entry and exit levels 102 and 104 therein. In particular, plunger 82 has access to the cassette in the cassette transfer position in the entry level 102 of removable magazine 26 through cutouts 28 to move that cassette to the cassette transfer position in the exit level 104 while paddle 80 has access to the cassette in the cassette transfer position in the exit level 104 of removable magazine 26 to move that cassette to the next most forward cassette holding position in removable magazine 26 toward the front end 106 thereof.

In operation, cassette circulating mechanism 81 cooperates with transporter mechanism 52 to feed cassettes sequentially through removable magazine 26 to and from the tape utilization position, aligned with single cassette insertion access 51, in tape drive 16. Each cassette in the magazine 26 may thus be supplied for data transfer, received and used, then returned individually to the magazine 26 after which a new cassette is fed to the tape drive 16.

Referring now specifically to FIG. 7, the paddle 80 is positioned, at rest, behind the magazine 26 in alignment with the cutout 34 on the rear bottom and side thereof. In this position, the paddle 80 is clear of the magazine 26 and magazine tray 32 as the magazine 26 is inserted. To circulate cassettes, the transporter mechanism 52, as shown for example in FIG. 5, is positioned abutting the exit cassette holding position of exit level 104 of the magazine 26 to accept an individual cassette therefrom. The paddle 80, when actuated and driven forward by a paddle drive mechanism 84, engages the narrow, rearward facing edge of the rearmost cassette in the cassette transfer position in the exit level 104 to shift the cassette forward by one cassette length. This forces the other cassettes in the exit level 104 to each shift forward towards front end 106 by one cassette length as well, so that the front most cassette in the exit level 104 is expelled out of the magazine 26 and into the transporter mechanism 52.

The paddle drive mechanism 84 is substantially similar to the magazine tray drive mechanism 36 described above in conjunction with FIG. 4. With reference to FIG. 4, the paddle drive mechanism 84 includes a drive motor 40 coupled by a cogged pulley drive assembly 42 to a vertically disposed worm gear 44, which engages the periphery of a gear wheel 46 that rotates about a horizontal axis. A pinion 48 concentric with a gear wheel 46 engages a horizontal rack 49 which is coupled to the paddle 80. The rack 49 and coupled paddle 80 are driven to the forward limit by the drive motor 40. Thereafter, the sequencer 50 drives the rack 49 and coupled paddle 80 in a rearward direction until the paddle 80 is again outside of cutout 34 of the magazine 26.

As the paddle drive mechanism 84 returns the paddle 80 to its original rearmost position outside the magazine 26, the cassette in the entry level 102, which had been positioned over the transfer aperture 31 in the central horizontal plate 30, is released by the paddle 80 and falls into the rearmost or cassette transfer position in the exit level 104 of the magazine 26. Normally, once the paddle 80 is outside of the magazine 26 and thus out of the way, the cassette in the rearmost portion of the entry level 102 of the magazine would fall into the rearmost position of the exit level 104 of the magazine 26 due to the force of gravity.

However, it is a well known occurrence for users to stand a PC chassis 10 on end or otherwise provide a "tower" type configuration, so that the magazine 26 sits on its side within the enclosure 12 or in some other position. In such a configuration, the cassettes move horizontally between levels 102 and 104 in the magazine 26 rather than vertically, and gravity cannot be relied upon to drop the cassette into the rearmost position of the exit level 104 of the magazine 26.

Referring to FIG. 8, plunger 82 is provided to force the cassette through the transfer aperture 31 in the central horizontal plate 30 into the exit level 104 of the magazine 26, regardless of whether this action is assisted by gravity or not. The plunger 82 is positioned, at rest, above the magazine 26 in alignment with the cutouts 28 on top thereof. In this position, the plunger 82 is clear of the magazine 26 and magazine tray 32 as the magazine 26 is inserted and/or removed.

The plunger 82 is mounted on support 86 and is spring actuated, by a spring not shown, to force the plunger 82 into contact with the broad, flat face of the cassette in the cassette transfer position in entry level 102 of the magazine 26. The downward or sideways force of the plunger 82 acts to shift the cassette through the transfer aperture 31 into the exit level 104 of the magazine 26.

FIG. 9 further illustrates cam mechanism 87 which controls the plunger 82. Cam mechanism 87 is actively coupled to the paddle drive mechanism 49. As the paddle 80 moves backward, a cam surface 88 attached thereto engages a follower surface 90 on the plunger 82 to force the plunger 82 upward. As the paddle 80 moves forward, the cam surface 88 and follower surface 90 are disengaged which allows the plunger 82 to once again apply pressure to shift the rearmost cassette in the cassette transfer position of the entry level 102 of the magazine 26 to the cassette transfer position of the exit level 104.

After the rearmost cassette is shifted to the exit level 104 of the magazine 26, and as the transporter mechanism 52 returns a cassette from the tape drive 16 to the entry level 102 of the magazine 26, the lateral shifter 70 moves the cassette from the cassette holder 52 into the entry level 104 of the magazine 26. This forces the other cassettes in the entry level 102 of the magazine 26 to each shift rearward by one cassette length, so that the rearmost cassette in the entry level 102 of the magazine 26 is positioned over the transfer aperture 31 in the central plate 30 and is adjacent the cassette positioned under the transfer aperture 31 on the exit level 104 of the magazine 26. In this manner, cassettes may be circulated through the magazine 26.

By way of illustration, the following paragraphs provide a general description of how the various components discussed above interact during operation of the system.

Initially, the transporter mechanism 52 is held in alignment with the upper door 22 in the bezel 20 and tape drive 16 when awaiting insertion of one or more cassettes. If a single cassette is inserted through the single cassette door 22, it is accepted into the cassette holder 68. The lateral shifter 70 and rollers 72 are actuated to move the cassette from the door 22 into the tape drive 16, to a distance sufficient for the tape drive 16 to accept the cassette and complete the loading operation. Upon completion of the data transfer operation, the cassette is ejected from the tape drive 16 and returned to the cassette holder 68 for removal by the rotation of the rollers 72. The shifter 70 is lowered out of the line of travel of the cassette by a cam (not shown).

Alternatively, a magazine 26 loaded with a plurality of cassettes may be inserted through the magazine door 24 and into the magazine tray 32. Initially, the tray drive 38 is in a quiescent state all the way forward toward front end 106. The magazine tray 32 is shifted toward the magazine door 24, so that the magazine 26 can be fully engaged therein. Upon automatic sensing of the presence of the magazine 26, as by a micro-switch or operator actuation of a start control, the tray drive 38 moves the magazine tray 32 and magazine 26 to a rearward position in the enclosure 12. At this point, the cassette circulation mechanisms are in a "wait" mode, with the paddle 80 and the plunger 82 in disengaged positions.

To start the sequence of successive insertions of cassettes into the tape drive 16, the transporter mechanism 52 is first positioned in line with the exit level 104 of the magazine 26. When the height position sensor 66 indicates that the cassette holder 68 is in alignment with the exit aperture of the magazine 26, the sequencer 50 operates the cassette circulation mechanisms through a cycle.

In this cycle, the paddle 80 is driven to shift the cassettes in the exit level 104 of the magazine 26 forward by one cassette length in the rear to front direction. The forward cassette is moved into the cassette holder 68 in the transporter mechanism 52. The paddle 80 then returns to its original resting position outside the magazine 26, momentarily leaving a single cassette gap in the rear of the exit level 104 of the magazine 26.

The available empty cassette position at the rear of the exit level 104 of the magazine 26 is thus available to be filled by the rearmost cassette in the entry level 102 of the magazine 26.

The cassette in the rearmost cassette holding position in entry level 102 in the magazine 26 is moved to the exit level 104, by movement of the plunger 82 and/or gravity. The plunger 82 pushes against the broad face of the cassette in the rearmost holding or transfer position in entry level 102 of the magazine 26 so that the cassette moves to the rearmost holding or transfer position in the exit level 104. The cutouts 28 in the top of the magazine 26 permit plunger 82 a full range of motion for positioning the cassette in the exit level 104. The plunger 82 is then returned to its resting position outside the magazine 26, which leaves a single-cassette-length opening at the rear position of the entry level 102.

When the cassette holder 68 is positioned in alignment with the tape drive door 22, lateral shifter 70 is rotated so that it engages the cassette, via its back edge, and moves it into the tape drive 16 sufficiently for the tape drive 16 to engage and position the cassette internally. The rollers 72 also assist in moving the cassette into the tape drive 16. Data transfer can thus begin, and be carried out for the full capacity of the cassette. In the interim, the transporter mechanism 52 is left at the level of the tape drive door 22.

When the tape drive 16 finishes the data transfer operation, the cassette is ejected and positioned within the cassette holder 68, and the cassette holder 68 is lowered to align the cassette with the intake or entry aperture at the front end 106 of entry level 102 in the magazine 26. The cassette is moved from the cassette holder 68 into the entry level 102 of the magazine 26 by the lateral shifter 70, thereby rearwardly shifting the other cassettes in the entry level 102 of the magazine 26. This rearward shifting moves the rearmost cassette in the entry level 102 of the magazine 26 into the cassette transfer position in entry level 102. This cassette transfer position is over the transfer aperture 31 in the central dividing plate 30 between the entry and exit levels of the magazine 26. The cassette in the cassette transfer position in entry level 102 is therefore positioned so its broad face abuts the broad face of the rearmost cassette, that is, the cassette in the cassette transfer position in the exit level 104. The transporter mechanism 52 is then moved down to the exit level 104 of the magazine, so that the sequence can be repeated with each cassette in turn, until all cassettes are filled with data via the tape drive 16, at which point the cassette holder 68 can be stopped in an upper position forming an aperture therethrough aligned with magazine door 24. The tray drive 38 is operated to bring the magazine tray 32 and magazine 26 forward so that the magazine 26 may be manually removed through the bezel 20 and a new one inserted.

Figure 11:
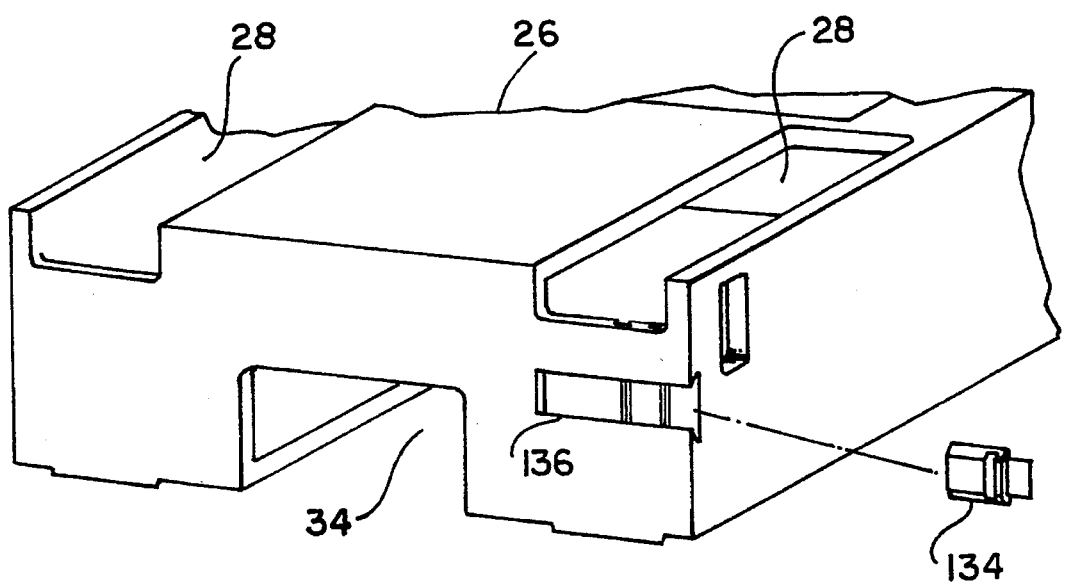
FIG. 11 is a partially cutaway perspective view of the rear of a removable magazine showing a write protect device including a slide and a self-capturing guide.

Referring now to FIG. 11, a partially cutaway perspective view of removable magazine 26 is shown illustrating the rear portion of the magazine including capture guide 136 and write protect slide 134 which is shown removed therefrom for convenience. In operation, write protect slide 134 is positioned within capture guide 136 in either of two fixed positions, the write protect on and write protect off positions. In addition to guiding write protect slide 134, capture guide 136 also serves to hold or capture slide 134 in either the write protect on or off position thereby eliminating the need for a separate capture element.

Conventional write protect detectors, not shown, detect the location of write protect slide 134 in the write protect on or off position and either inhibit or permit the writing of data to a cassette within the removable magazine 26. Write protect detectors and associated inhibit circuits are conventional and are therefore not describe herein in detail.

The system described herein can be used either with an enclosure in a PC chassis, as shown, or as a stand alone unit. In the latter event, an interior or separate power supply may be employed.

The system described herein can be used with a different direction of movement of cassettes in the magazine, so that the entry and exit levels 102 and 104 are interchanged. Such a change would require an appropriate change of the cassette circulation mechanisms, for example, as shown in the parent application incorporated by reference herein.

The system described herein can be used with any tape drive. For example, rather than using DAT tape drives, a corresponding system may employ audio or video cassettes.

The system described herein can be constructed without the individual cassette insertion capability. Such a system is obviously less desirable than the present invention, but would entail less expense to build.

The system described herein can be constructed with a different individual cassette insertion capability. For example, if it is desired to load a single cassette directly into the tape drive along with a magazine, the logic may have to be slightly changed to eject the single cassette before utilizing the magazine.

The system described herein can be constructed so that the tape drive and the automatic cassette loader mechanism occupy different portions of the enclosure. For example, the magazine and tape drive may be inverted so that the tape drive is below the magazine, where this is advantageous.

Alternatively, logic could be included to cycle cassettes through the magazine until a desired magazine is in position for the reader.

In summary, the present invention discloses an automatic cassette loading system for tape drives comprising a tape drive, a removable magazine resident adjacent thereto, and a transporter mechanism for shifting cassettes between the apertures at the front end of the entry and exit levels in the magazine and a loading door of the tape drive unit. Cassettes in the removable magazine are disposed in the entry and exit levels, and shifted therebetween after each successive cassette is derived from the tape drive and a new one is supplied. The transporter mechanism moves the individual cassette between the levels of the magazine and the tape drive. The system is configured to fit into an enclosure substantially defining a standard peripheral form factor, with the tape drive occupying half of the enclosure and the magazine occupying the other half.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. Apparatus for use in tape cassette loading systems, said apparatus comprising:
   a magazine housing for holding tape cassettes in a first plurality of cassette positions in a first plane and in a second plurality of cassette positions in a second plane parallel therewith, each such cassette position in said first plurality separated from each such cassette position in said second plurality, wherein said cassettes are supported on their broad faces, said first plurality of cassette positions are in a first line and include a first transfer position disposed at a first end of said first line, said second plurality of cassette positions are in a second line and include a second transfer position disposed at a first end of said second line;
   a cassette intake position at a second end of said first line of said first plurality of tape cassette positions;
   a cassette exit position at a second end of said second line of said second plurality of tape cassette positions;
   circulating means for sequentially circulating said cassettes, including first pushing means for pushing a multiplicity of cassettes along said first plane, second pushing means for pushing a multiplicity of cassettes along said second plane and shifting means for shifting cassettes between said first and second planes, said shifting means including:
      paddle means for expelling a first one of said tape cassettes from said second transfer position to an adjacent position in said second plane;
      plunger means for transferring a second one of said tape cassettes from said first transfer position in said first plurality into said second transfer position in said second plurality; and
   cassette transport means including a cassette transport position for accepting a third one of said tape cassettes from said cassette exit position and for transferring said third tape cassette to said cassette intake position, including:
      a cassette holder;
      means, coupled to the cassette holder, for moving the cassette holder between the first and second planes; and
      lateral shifter means, coupled to the cassette holder, for moving said third tape cassette into and out of the cassette holder.

2. The invention of claim 1 wherein said paddle means further comprises:
   means for moving said first tape cassette from said transfer position in said second plane into another position in said second plane to push said third tape cassette in said exit position into said cassette transport position.

3. The invention of claim 1 wherein said paddle means further comprises:
   means for retaining said second tape cassette at least partially in said transfer position in said first plane until said first tape cassette is fully expelled from said transfer position in said second plane.

4. The invention of claim 1 wherein said paddle means further comprises:
   means for moving said first tape cassette from said transfer position in said second plane into another position in said second plane to push said third tape cassette in said exit position into said cassette transport position while retaining said second tape cassette at least partially in said transfer position in said first plane until said first tape cassette is fully expelled from said transfer position in said second plane.

5. The invention of claim 1 wherein said paddle means further comprises:
   a paddle aperture in said magazine housing communicating with said transfer position in said second plane; and
   paddle arm means mounted external to said magazine housing and positionable to interact with said first tape cassette in said transfer position in said second plane through said paddle aperture.

6. The invention of claim 5 wherein said plunger means further comprises:
   a plunger aperture in said magazine housing communicating with said transfer position in said first plane; and
   plunger arm means mounted external to said magazine housing and positionable to interact with said second tape cassette in said transfer position in said first plane through said plunger aperture.

7. The invention of claim 1 further comprising:
   camming means for operating said plunger means to push said second tape cassette from said transfer position in said first plane to said transfer position in said second plane after said paddle means expels said first tape cassette from said transfer position in said second plane.

8. The invention of claim 7 wherein said paddle means further comprises:
   means for moving said first tape cassette from said transfer position in said second plane into another position in said second plane to push said third tape cassette in said exit position into said cassette transport position.

9. The invention of claim 8, further comprising:
   a tape drive having a tape utilization position.

10. The invention of claim 9, wherein said transport means further comprises:
    means responsive to said paddle means for transporting said third tape cassette pushed into said transport position to said tape utilization position and from said tape utilization position to said intake position.

11. The invention of claim 10, wherein said magazine housing, tape drive and paddle, plunger and transport means are mounted within a cavity defining an enclosure of about 5.25 inches.

12. The invention of claim 1 further comprising:
    movable tray means for mounting said magazine housing and for supporting said paddle and plunger means.

13. The invention of claim 12 wherein said magazine housing further comprises:
    a paddle aperture in said magazine housing for permitting contact between said paddle means and said transfer position in said second plane; and
    a plunger aperture in said magazine housing for permitting contact between said plunger means and said transfer position in said first plane.

14. The invention of claim 13 wherein said movable tray means further comprises:
    camming means for operating said plunger means to push said second tape cassette from said transfer position in said first plane to said transfer position in said second plane after said paddle means expels said first tape cassette from said transfer position in said second plane.

15. The invention of claim 14 wherein said paddle means further comprises:

means for moving said first tape cassette from said transfer position in said second plane into another position in said second plane to push said third tape cassette from an exit position in said second plane into said cassette transport position.

16. The invention of claim 15, further comprising:

a tape drive having a tape utilization position; and transport means for transporting said third tape cassette pushed into said transport position to said tape utilization position and from said tape utilization position to an intake position in said first plane.

17. The invention of claim 16 wherein said magazine housing, tape drive and movable tray and transport means are mounted within a cavity defining an enclosure.

18. The invention of claim 17 wherein said movable tray means further comprises:

means for supporting the magazine housing in a insertion position extending partially out of said cavity; and means for retracting said magazine housing into an operating position with said cavity.

19. The invention of claim 18 wherein said magazine housing further comprises:

door means for selectively preventing the addition to or removal of said plurality of tape cassettes from said first and second planes.

20. The invention of claim 14 wherein said door means further comprises:

automatic means for preventing the insertion to or removal of said cassettes from said first and second planes unless said magazine housing is in said operating position in said cavity.

21. The invention of claim 12 wherein said magazine housing further comprises:

door means for selectively preventing the addition to or removal of said plurality of tape cassettes from said first and second planes.

22. The invention of claim 21 wherein said movable tray means further comprises:

automatic means for permitting the insertion to or removal of said cassettes through said door means only when magazine housing is mounted in said movable tray means.

23. The invention of claim 22 wherein said magazine housing further comprises:

write protect means for selectively write protecting all of said tape cassettes in first and second planes.

24. An automated cassette loader system, comprising:

an enclosure;

a tape drive mounted in the enclosure;

a magazine removably mounted in the enclosure for holding tape cassettes in a first plurality of cassette positions in a first plane and in a second plurality of cassette positions in a second plane parallel therewith, each such cassette position in said first plurality separated from each such cassette position in said second plurality, wherein said cassettes are supported on their broad faces, first plurality of cassette positions are in a first line and include a first transfer position disposed at a first end of said first line, said second plurality of cassette positions are in a second line and include a second transfer position disposed at a first end of said second line;

a cassette intake position at a second end of the first line of said first plurality of tape cassette positions;

a cassette exit position at a second end of the second line of said second plurality of tape cassette positions;

transporter means, disposed within the enclosure adjacent both the magazine and the tape drive, for transporting the cassettes between the tape drive and the magazine, including:

a cassette holder;

elevator means, coupled to the cassette holder, for moving the cassette holder between the first and second planes of the magazine and a front loading entrance of the tape drive; and lateral shifter means, coupled to the cassette holder, for moving one of said cassettes into and out of the cassette holder; and circulation means for sequentially circulating said cassettes from the magazine to the tape drive by expelling one of said cassettes from the second plane to the transporter means and then pushing one of said cassettes from the first plane to the second plane, including first pushing means for pushing a multiplicity of cassettes along said first plane, second pushing means for pushing a multiplicity of cassettes along a second plane and shifting means for shifting cassettes between said first and second planes, said shifting means including:

paddle means for advancing one of said cassettes from said second transfer position to an adjacent position in said second plane; and plunger means for urging one of said cassettes from said first transfer position in said first plurality into said second transfer position in said second plurality.

25. The invention of claim 24 above, wherein the enclosure has a height of about 5.25 inches.

26. The invention of claim 25 above, wherein the second plane further comprises:

an exit aperture aligned in a plane parallel with a front loading entrance of the tape drive.

27. The invention of claim 25 above, wherein the first plane further comprises:

an entry aperture aligned in a plane parallel with a front loading entrance of the tape drive.

28. The invention of claim 27 above, further comprising:

an aperture communicating between the first and second planes of the magazine.

29. The invention of claim 24 above, further comprising:

tray means, mounted in the enclosure, for moving a magazine partially inserted into the enclosure into a fully inserted position therein, and for partially expelling a magazine out of the enclosure.

30. The invention of claim 24 above, further comprising:

roller means, coupled to the cassette holder, for assisting the movement of the one cassette into and out of the cassette holder.

31. The invention of claim 24 above, further comprising:

sensor means for determining the position of the cassette holder; and feedback means responsive to the sensor means for positioning the cassette holder at selected locations adjacent the first and second planes of the magazine and the front loading entrance of the tape drive.

32. Apparatus for use in tape cassette loading systems, said apparatus comprising:

a magazine housing for holding a plurality of tape cassettes in a first plurality of cassette positions wherein a broad face of each of said tape cassettes is substantially in a first plane, and in a second plurality of cassette positions wherein a broad face of each of said tape cassettes is substantially in a second plane parallel with said first plane, and wherein each such cassette position in said first plurality is separated from each such cassette position in said second plurality, said first plurality of cassette positions are in a first line and include a first transfer position disposed at a first end of said first line of said first plurality of tape cassette positions, said second plurality of cassette positions are in a second line and include a second transfer position disposed at a first end of said second line of second plurality of cassette positions;

a cassette intake position at a second end of said first line of said first plurality of tape cassette positions;

a cassette exit position at a second end of said second line of said plurality of tape cassette positions;

cassette transport means including a cassette transport position for accepting a third one of said tape cassettes from said cassette exit position and for transferring said third tape cassette to said cassette intake position, including:

a cassette holder;

means, coupled to the cassette holder, for moving the cassette holder between the first and second planes; and lateral shifter means, coupled to the cassette holder, for moving said third tape cassette into and out of the cassette holder;

circulating means for sequentially circulating said cassettes, including first pushing means for pushing a multiplicity of cassettes along said first plane, second pushing means for pushing a multiplicity of cassettes along a second plane and shifting means for shifting cassettes between said first and second planes, said shifting means including:

paddle means for expelling a first one of said plurality of tape cassettes from said second transfer position in said second plane; and plunger means for transferring a second one of said plurality of tape cassettes from said first transfer position in said first plurality along a path substantially perpendicular to said first and second planes into said second transfer position in said second plurality.

33. The invention of claim 32 wherein said magazine housing further comprises:

divider means positioned in said housing for separating tape cassette positions in said first plane from tape cassette positions in said second plane, said divider means including a transfer aperture located between said transfer positions in said first and second plane.

34. The invention of claim 32 wherein said paddle means further comprises:

means for moving said first tape cassette from said transfer position in said second plane into another position in said second plane to push said third tape cassette in said exit position into said cassette transport position.

35. The invention of claim 32 wherein said paddle means further comprises:

means for retaining said second tape cassette at least partially in said transfer position in said first plane until said first tape cassette is fully expelled from said transfer position in said second plane.

36. The invention of claim 32 wherein said paddle means further comprises:

means for moving said first tape cassette from said transfer position in said second plane into another position in said second plane to push said third tape cassette in said exit position into said cassette transport position while retaining said second tape cassette at least partially in said transfer position in said first plane until said first tape cassette is fully expelled from said transfer position in said second plane.

37. The invention of claim 32 wherein said paddle means further comprises:

a paddle aperture in said magazine housing communicating with said transfer position in said second plane; and paddle arm means mounted external to said magazine housing and positionable to interact with said first tape cassette in said transfer position in said second plane through said paddle aperture.

38. The invention of 37 wherein said plunger means further comprises:

a plunger aperture in said magazine housing communicating with said transfer position in said first plane; and plunger arm means mounted external to said magazine housing and positionable to interact with said second tape cassette in said transfer position in said first plane through said plunger aperture.

39. The invention of claim 32 further comprising:

camming means for operating said plunger means to push said second tape cassette from said transfer position in said first plane to said transfer position in said second plane after said paddle means expels said first tape cassette from said transfer position in said second plane.

40. The invention of claim 39 wherein said paddle means further comprises:

means for moving said first tape cassette from said transfer position in said second plane into another position in said second plane to push said third tape cassette in said exit position into said cassette transport position.

41. The invention of claim 40, further comprising:

a tape drive having a tape utilization position.

42. The invention of claim 41, wherein said transport means further comprises:

means responsive to said paddle means for transporting said third tape cassette pushed into said transport position to said tape utilization position and from said tape utilization position to said intake position.

43. The invention of claim 42, wherein said magazine housing, tape drive and paddle, plunger and transport means are mounted within a cavity defining a standard height enclosure of about 5.25 inches.

44. The invention of claim 32, further comprising:

movable tray means for mounting said magazine housing and for supporting said paddle and plunger means.

45. The invention of claim 44, wherein said magazine housing further comprises:

a paddle aperture in said magazine housing for permitting contact between said paddle means and said transfer position in said second plane; and a plunger aperture in said magazine housing for permitting contact between said plunger means and said transfer position in said first plane.

46. The invention of claim 45, wherein said movable tray means further comprises:

camming means for operating said plunger means to push said second tape cassette from said transfer position in said first plane to said transfer position in said second plane after said paddle means expels said first tape cassette from said transfer position in said second plane.

47. The invention of claim 46 wherein said paddle means further comprises:

means for moving said first tape cassette from said transfer position in said second plane into another position in said second plane to push said third tape cassette from an exit position in said second plane into said cassette transport position.

48. The invention of claim 47, further comprising:

a tape drive having a tape utilization position; and transport means for transporting said third tape cassette pushed into said transport position to said tape utilization position and from said tape utilization position to an intake position in said first plane.

49. The invention of claim 48, wherein said magazine housing, tape drive and movable tray and transport means are mounted within a cavity defining a standard height enclosure.

50. The invention of claim 49, wherein said movable tray means further comprises:

means for supporting the magazine housing in an insertion position extending partially out of said cavity; and means for retracting said magazine housing into an operating position with said cavity.

51. The invention of claim 50, wherein said magazine housing further comprises:

door means for selectively preventing the addition to or removal of said tape cassettes from said first and second planes.

52. The invention of claim 51, wherein said door means further comprises:

automatic means for preventing the insertion to or removal of said cassettes from said first and second planes unless said magazine housing is in said operating position in said cavity.

53. The invention of claim 44 wherein said magazine housing further comprises:

door means for selectively preventing the addition to or removal of said tape cassettes from said first and second planes.

54. The invention of claim 53 wherein said movable tray means further comprises:

automatic means for permitting the insertion to or removal of said cassettes through said door means only when magazine housing is mounted in said movable tray means.

55. The invention of claim 54 wherein said magazine housing further comprises:

write protect means for selectively write protecting all tape cassettes in first and second planes.

* * * * *